(12) United States Patent
Bushey et al.

(10) Patent No.: US 9,112,972 B2
(45) Date of Patent: Aug. 18, 2015

(54) SYSTEM AND METHOD FOR PROCESSING SPEECH

(71) Applicant: INTERACTIONS LLC, Franklin, MA (US)

(72) Inventors: Robert R. Bushey, Round Rock, TX (US); Benjamin Anthony Knott, Cedar Park, TX (US); John Mills Martin, Austin, TX (US); Sarah Korth, Chicago, IL (US)

(73) Assignee: Interactions LLC, Franklin, MA (US)

( * ) Notice: Subject to any disclaimer, the term of this patent is extended or adjusted under 35 U.S.C. 154(b) by 0 days.

(21) Appl. No.: 13/644,305

(22) Filed: Oct. 4, 2012

(65) Prior Publication Data

US 2013/0058466 A1    Mar. 7, 2013

Related U.S. Application Data

(63) Continuation of application No. 12/750,792, filed on Mar. 31, 2010, now Pat. No. 8,306,192, which is a continuation of application No. 11/809,817, filed on Jun. 1, 2007, now Pat. No. 7,720,203, which is a continuation of application No. 11/005,494, filed on Dec. 6, 2004, now Pat. No. 7,242,751.

(51) Int. Cl.
*H04M 1/64* (2006.01)
*H04M 7/00* (2006.01)
*H04M 3/51* (2006.01)

(52) U.S. Cl.
CPC ........ *H04M 3/5166* (2013.01); *H04M 2201/40* (2013.01); *H04M 2203/2011* (2013.01)

(58) Field of Classification Search
USPC ....................................... 379/88.01
See application file for complete search history.

(56) References Cited

U.S. PATENT DOCUMENTS

| | | |
|---|---|---|
| 3,811,012 A | 5/1974 | Barber |
| 4,376,874 A | 3/1983 | Karban et al. |
| 4,555,594 A | 11/1985 | Friedes et al. |
| 4,565,903 A | 1/1986 | Riley |
| 4,577,066 A | 3/1986 | Bimonte et al. |
| 4,618,984 A | 10/1986 | Das et al. |
| 4,677,569 A | 6/1987 | Nakano et al. |
| 4,688,195 A | 8/1987 | Thompson et al. |

(Continued)

FOREIGN PATENT DOCUMENTS

| | | |
|---|---|---|
| EP | 0424015 A2 | 4/1991 |
| EP | 0424015 A3 | 4/1991 |

(Continued)

OTHER PUBLICATIONS

Supplementary European Search Report, EP0876652, Application No. 97903925, Apr. 14, 1999, 26 pages.

(Continued)

*Primary Examiner* — Joseph T Phan
(74) *Attorney, Agent, or Firm* — Fenwick & West LLP

(57) ABSTRACT

Systems and methods for processing audio are provided. The system may include a processor to convert an audio input received via a call to text. The processor may perform a comparison between a portion of the text to one or more phrases included in a table. The processor may also make a selection of at least one of a first object or a first action based on the comparison. The processor may further route the call based on the at least one of the first object or the first action.

20 Claims, 3 Drawing Sheets

| SYNONYM TABLE | |
|---|---|
| *SPEECH* | *SYNONYM* |
| NEED HELP USING | HOW TO USE |
| I'D LIKE TO GET | ACQUIRE |
| GET OUT OF | CANCEL |
| DISCONNECT | CANCEL |
| I'D LIKE TO KNOW | INQUIRE |
| PROVIDE ME WITH | ACQUIRE |
| GET ME HELP | HOW TO USE |
| HOW MUCH | INQUIRE |

(56) References Cited

U.S. PATENT DOCUMENTS

| | | |
|---|---|---|
| 4,696,028 A | 9/1987 | Morganstein et al. |
| 4,760,593 A | 7/1988 | Shapiro et al. |
| 4,788,715 A | 11/1988 | Lee |
| 4,829,576 A | 5/1989 | Porter |
| 4,922,221 A | 5/1990 | Sato et al. |
| 4,935,927 A | 6/1990 | Kaewell, Jr. et al. |
| 4,953,204 A | 8/1990 | Cuschleg, Jr. et al. |
| 4,962,535 A | 10/1990 | Kimura et al. |
| 4,964,077 A | 10/1990 | Eisen et al. |
| 4,967,405 A | 10/1990 | Upp et al. |
| 4,975,841 A | 12/1990 | Kehnemuyi et al. |
| 4,989,230 A | 1/1991 | Gillig et al. |
| 5,042,006 A | 8/1991 | Flohrer |
| 5,043,718 A | 8/1991 | Shimura |
| 5,049,874 A | 9/1991 | Ishida et al. |
| 5,093,659 A | 3/1992 | Yamada |
| 5,113,430 A | 5/1992 | Richardson, Jr. et al. |
| 5,125,024 A | 6/1992 | Gokcen et al. |
| 5,127,042 A | 6/1992 | Gillig et al. |
| 5,142,695 A | 8/1992 | Roberts et al. |
| 5,155,759 A | 10/1992 | Saegusa et al. |
| 5,187,735 A | 2/1993 | Herrero Garcia et al. |
| 5,206,899 A | 4/1993 | Gupta et al. |
| 5,218,716 A | 6/1993 | Comroe et al. |
| 5,229,701 A | 7/1993 | Leman et al. |
| 5,231,670 A | 7/1993 | Goldhor et al. |
| 5,235,679 A | 8/1993 | Yoshizawa et al. |
| 5,241,678 A | 8/1993 | Futamura et al. |
| 5,247,564 A | 9/1993 | Zicker |
| 5,247,567 A | 9/1993 | Hirano |
| 5,260,988 A | 11/1993 | Schellinger et al. |
| 5,297,183 A | 3/1994 | Bareis et al. |
| 5,299,260 A | 3/1994 | Shaio |
| 5,309,509 A | 5/1994 | Cocklin et al. |
| 5,309,513 A | 5/1994 | Rose |
| 5,311,574 A | 5/1994 | Livanos |
| 5,335,269 A | 8/1994 | Steinlicht |
| 5,353,331 A | 10/1994 | Emery et al. |
| 5,357,564 A | 10/1994 | Gupta et al. |
| 5,367,558 A | 11/1994 | Gillig et al. |
| 5,373,161 A | 12/1994 | Tararine et al. |
| 5,415,416 A | 5/1995 | Scagnelli et al. |
| 5,416,830 A | 5/1995 | MacMillan, Jr. et al. |
| 5,432,845 A | 7/1995 | Burd et al. |
| 5,442,680 A | 8/1995 | Schellinger et al. |
| 5,455,903 A | 10/1995 | Jolissaint et al. |
| 5,469,496 A | 11/1995 | Emery et al. |
| 5,473,677 A | 12/1995 | D'Amato et al. |
| 5,497,373 A | 3/1996 | Hulen et al. |
| 5,509,055 A | 4/1996 | Ehrlich et al. |
| 5,515,366 A | 5/1996 | Chieu et al. |
| 5,521,965 A | 5/1996 | D'Alessio et al. |
| 5,522,046 A | 5/1996 | McMillen et al. |
| 5,530,744 A | 6/1996 | Charalambous et al. |
| 5,530,848 A | 6/1996 | Gilbert et al. |
| 5,546,542 A | 8/1996 | Cosares et al. |
| 5,550,895 A | 8/1996 | Burson et al. |
| 5,553,117 A | 9/1996 | Peterson et al. |
| 5,555,299 A | 9/1996 | Maloney et al. |
| 5,557,518 A | 9/1996 | Rosen |
| 5,559,860 A | 9/1996 | Mizikovsky |
| 5,590,186 A | 12/1996 | Liao et al. |
| 5,594,791 A | 1/1997 | Szlam et al. |
| 5,598,460 A | 1/1997 | Tendler |
| 5,621,789 A | 4/1997 | McCalmont et al. |
| 5,627,971 A | 5/1997 | Miernik |
| 5,630,121 A | 5/1997 | Braden-Harder et al. |
| 5,632,002 A | 5/1997 | Hashimoto et al. |
| 5,636,243 A | 6/1997 | Tanaka |
| 5,644,620 A | 7/1997 | Shimura |
| 5,652,789 A | 7/1997 | Miner et al. |
| 5,657,383 A | 8/1997 | Gerber et al. |
| 5,659,599 A | 8/1997 | Arumainayagam et al. |
| 5,673,308 A | 9/1997 | Akhavan |
| 5,675,707 A | 10/1997 | Gorin et al. |
| 5,675,817 A | 10/1997 | Moughanni et al. |
| 5,729,600 A | 3/1998 | Blaha et al. |
| 5,732,133 A | 3/1998 | Mark |
| 5,732,395 A | 3/1998 | Silverman |
| 5,737,703 A | 4/1998 | Byrne |
| 5,737,723 A | 4/1998 | Riley et al. |
| 5,745,850 A | 4/1998 | Aldermeshian et al. |
| 5,748,147 A | 5/1998 | Bickley et al. |
| 5,754,639 A | 5/1998 | Flockhart et al. |
| 5,754,978 A | 5/1998 | Perez-Mendez et al. |
| 5,761,432 A | 6/1998 | Bergholm et al. |
| 5,787,360 A | 7/1998 | Johnston et al. |
| 5,794,001 A | 8/1998 | Malone et al. |
| 5,797,723 A | 8/1998 | Frost et al. |
| 5,799,279 A | 8/1998 | Gould et al. |
| 5,809,269 A | 9/1998 | Favot et al. |
| 5,828,735 A | 10/1998 | Farfan |
| 5,842,112 A | 11/1998 | Fuller et al. |
| 5,845,062 A | 12/1998 | Branton, Jr. et al. |
| 5,867,495 A | 2/1999 | Elliott et al. |
| 5,867,562 A | 2/1999 | Scherer |
| 5,867,817 A | 2/1999 | Catallo et al. |
| 5,884,262 A | 3/1999 | Wise et al. |
| 5,900,608 A | 5/1999 | Iida |
| 5,905,793 A | 5/1999 | Flockhart et al. |
| 5,909,439 A | 6/1999 | Kuwabara et al. |
| 5,917,903 A | 6/1999 | Jolissaint |
| 5,918,213 A | 6/1999 | Bernard et al. |
| 5,923,646 A | 7/1999 | Mandhyan |
| 5,923,744 A | 7/1999 | Cheng |
| 5,923,745 A | 7/1999 | Hurd |
| 5,930,337 A | 7/1999 | Mohler |
| 5,937,051 A | 8/1999 | Hurd et al. |
| 5,940,476 A | 8/1999 | Morganstein et al. |
| 5,946,377 A | 8/1999 | Wolf |
| 5,946,388 A | 8/1999 | Walker et al. |
| 5,950,133 A | 9/1999 | Bledsoe |
| 5,953,704 A | 9/1999 | McIlroy et al. |
| 5,960,384 A | 9/1999 | Brash |
| 5,974,127 A | 10/1999 | Wernli et al. |
| 5,978,463 A | 11/1999 | Jurkevics et al. |
| 5,987,116 A | 11/1999 | Petrunka et al. |
| 5,991,756 A | 11/1999 | Wu |
| 5,995,839 A | 11/1999 | Coursey et al. |
| 5,995,979 A | 11/1999 | Cochran |
| 5,999,965 A | 12/1999 | Kelly |
| 6,002,689 A | 12/1999 | Christie et al. |
| 6,002,760 A | 12/1999 | Gisby |
| 6,003,011 A | 12/1999 | Sarin et al. |
| 6,014,439 A | 1/2000 | Walker et al. |
| 6,016,336 A | 1/2000 | Hanson |
| 6,028,601 A | 2/2000 | Machiraju et al. |
| 6,038,293 A | 3/2000 | McNerney et al. |
| 6,038,305 A | 3/2000 | McAllister et al. |
| 6,041,229 A | 3/2000 | Turner |
| 6,044,146 A | 3/2000 | Gisby et al. |
| 6,049,594 A | 4/2000 | Furman et al. |
| 6,061,335 A | 5/2000 | De Vito et al. |
| 6,061,433 A | 5/2000 | Polcyn et al. |
| 6,064,731 A | 5/2000 | Flockhart et al. |
| 6,067,357 A | 5/2000 | Kishinsky et al. |
| 6,069,588 A | 5/2000 | O'Neill, Jr. |
| 6,070,142 A | 5/2000 | McDonough et al. |
| 6,073,031 A | 6/2000 | Helstab et al. |
| 6,085,169 A | 7/2000 | Walker et al. |
| 6,085,176 A | 7/2000 | Woolston |
| 6,088,431 A | 7/2000 | LaDue |
| 6,091,949 A | 7/2000 | Sanchez |
| 6,100,885 A | 8/2000 | Donnelly et al. |
| 6,104,798 A | 8/2000 | Lickiss et al. |
| 6,118,796 A | 9/2000 | Best et al. |
| 6,118,866 A | 9/2000 | Shtivelman |
| 6,119,101 A | 9/2000 | Peckover |
| 6,130,938 A | 10/2000 | Erb |
| 6,130,942 A | 10/2000 | Stenlund |
| 6,138,139 A * | 10/2000 | Beck et al. ............ 709/202 |
| 6,141,653 A | 10/2000 | Conklin et al. |
| 6,144,938 A | 11/2000 | Surace et al. |
| RE37,001 E | 12/2000 | Morganstein et al. |

(56) References Cited

U.S. PATENT DOCUMENTS

| | | | |
|---|---|---|---|
| 6,157,655 | A | 12/2000 | Shtivelman |
| 6,170,011 | B1 * | 1/2001 | Macleod Beck et al. ...... 709/224 |
| 6,173,042 | B1 | 1/2001 | Wu |
| 6,173,266 | B1 | 1/2001 | Marx et al. |
| 6,173,289 | B1 | 1/2001 | Sonderegger et al. |
| 6,173,399 | B1 | 1/2001 | Gilbrech |
| 6,175,564 | B1 * | 1/2001 | Miloslavsky et al. ......... 370/352 |
| 6,175,621 | B1 | 1/2001 | Begeja |
| 6,181,776 | B1 | 1/2001 | Crossley et al. |
| 6,182,052 | B1 | 1/2001 | Fulton et al. |
| 6,185,427 | B1 | 2/2001 | Krasner et al. |
| 6,188,888 | B1 | 2/2001 | Bartle et al. |
| 6,192,398 | B1 | 2/2001 | Hunt |
| 6,201,950 | B1 | 3/2001 | Fuller et al. |
| 6,202,051 | B1 | 3/2001 | Woolston |
| 6,208,854 | B1 | 3/2001 | Roberts et al. |
| 6,219,805 | B1 | 4/2001 | Jones et al. |
| 6,233,313 | B1 | 5/2001 | Farris et al. |
| 6,233,546 | B1 | 5/2001 | Datig |
| 6,240,181 | B1 | 5/2001 | Tunstall |
| 6,240,297 | B1 | 5/2001 | Jadoul |
| 6,246,986 | B1 | 6/2001 | Ammicht et al. |
| 6,259,786 | B1 | 7/2001 | Gisby |
| 6,260,014 | B1 | 7/2001 | Bahl et al. |
| 6,263,071 | B1 | 7/2001 | Swan et al. |
| 6,269,153 | B1 | 7/2001 | Carpenter et al. |
| 6,269,336 | B1 | 7/2001 | Ladd et al. |
| 6,295,432 | B1 | 9/2001 | Inoue et al. |
| 6,301,350 | B1 | 10/2001 | Henningson et al. |
| 6,314,402 | B1 | 11/2001 | Monaco et al. |
| 6,317,439 | B1 | 11/2001 | Cardona et al. |
| 6,317,884 | B1 | 11/2001 | Eames et al. |
| 6,320,534 | B1 | 11/2001 | Goss |
| 6,320,951 | B1 | 11/2001 | Shtivelman et al. |
| 6,327,343 | B1 | 12/2001 | Epstein et al. |
| 6,327,350 | B1 | 12/2001 | Spangler et al. |
| 6,332,082 | B1 | 12/2001 | Fuller et al. |
| 6,334,127 | B1 | 12/2001 | Bieganski et al. |
| 6,339,980 | B1 | 1/2002 | Woolf |
| 6,353,608 | B1 | 3/2002 | Cullers et al. |
| 6,356,936 | B1 | 3/2002 | Donoho et al. |
| 6,362,778 | B2 | 3/2002 | Neher |
| 6,366,658 | B1 | 4/2002 | Bjornberg et al. |
| 6,366,668 | B1 | 4/2002 | Borst et al. |
| 6,373,817 | B1 | 4/2002 | Kung et al. |
| 6,377,662 | B1 | 4/2002 | Hunt et al. |
| 6,381,329 | B1 | 4/2002 | Uppaluru et al. |
| 6,385,584 | B1 | 5/2002 | McAllister et al. |
| 6,389,400 | B1 | 5/2002 | Bushey et al. |
| 6,400,804 | B1 | 6/2002 | Bilder |
| 6,400,996 | B1 | 6/2002 | Hoffberg et al. |
| 6,405,159 | B2 | 6/2002 | Bushey et al. |
| 6,411,687 | B1 | 6/2002 | Bohacek et al. |
| 6,411,692 | B1 | 6/2002 | Scherer |
| 6,414,966 | B1 | 7/2002 | Kulkarni et al. |
| 6,418,424 | B1 | 7/2002 | Hoffberg et al. |
| 6,421,433 | B1 | 7/2002 | Arsenault |
| 6,424,840 | B1 | 7/2002 | Fitch et al. |
| 6,434,524 | B1 | 8/2002 | Weber |
| 6,434,546 | B1 | 8/2002 | Williamowski et al. |
| 6,434,687 | B1 | 8/2002 | Huppenthal |
| 6,438,520 | B1 | 8/2002 | Curt et al. |
| 6,442,247 | B1 | 8/2002 | Garcia |
| 6,449,226 | B1 | 9/2002 | Kumagai |
| 6,466,654 | B1 | 10/2002 | Cooper et al. |
| 6,480,593 | B1 | 11/2002 | Munday et al. |
| 6,483,895 | B2 | 11/2002 | Bixler et al. |
| 6,483,897 | B1 | 11/2002 | Millrod |
| 6,483,899 | B2 | 11/2002 | Agraharam et al. |
| 6,484,027 | B1 | 11/2002 | Mauney et al. |
| 6,496,567 | B1 | 12/2002 | Bjornberg et al. |
| 6,496,836 | B1 | 12/2002 | Ronchi et al. |
| 6,501,753 | B1 | 12/2002 | Lin et al. |
| 6,502,077 | B1 | 12/2002 | Speicher |
| 6,505,055 | B1 | 1/2003 | Kahn et al. |
| 6,509,833 | B2 | 1/2003 | Tate |
| 6,510,414 | B1 | 1/2003 | Chaves |
| 6,513,010 | B1 | 1/2003 | Lewin et al. |
| 6,516,060 | B1 | 2/2003 | Foladare et al. |
| 6,519,562 | B1 | 2/2003 | Phillips et al. |
| 6,522,742 | B1 | 2/2003 | Crosby et al. |
| 6,526,126 | B1 | 2/2003 | Morganstein et al. |
| 6,529,871 | B1 | 3/2003 | Kanevsky et al. |
| 6,532,444 | B1 | 3/2003 | Weber |
| 6,535,596 | B1 | 3/2003 | Frey et al. |
| 6,538,666 | B1 | 3/2003 | Ozawa et al. |
| 6,546,087 | B2 | 4/2003 | Shaffer et al. |
| 6,553,112 | B2 | 4/2003 | Ishikawa |
| 6,553,113 | B1 | 4/2003 | Dhir et al. |
| 6,556,671 | B1 | 4/2003 | Beauvois |
| 6,560,329 | B1 | 5/2003 | Draginich et al. |
| 6,570,967 | B2 | 5/2003 | Katz |
| 6,571,240 | B1 | 5/2003 | Ho et al. |
| 6,574,213 | B1 | 6/2003 | Anandakumar et al. |
| 6,574,470 | B1 | 6/2003 | Chow et al. |
| 6,574,599 | B1 | 6/2003 | Lim et al. |
| 6,577,718 | B1 | 6/2003 | Kalmanek, Jr. et al. |
| 6,581,033 | B1 | 6/2003 | Reynar et al. |
| 6,584,180 | B2 | 6/2003 | Nemoto |
| 6,584,191 | B1 | 6/2003 | McPartlan et al. |
| 6,587,475 | B1 | 7/2003 | Przygienda |
| 6,587,556 | B1 | 7/2003 | Judkins et al. |
| 6,587,558 | B2 | 7/2003 | Lo |
| 6,587,683 | B1 | 7/2003 | Chow et al. |
| 6,589,136 | B2 | 7/2003 | Ephraim et al. |
| 6,594,470 | B1 | 7/2003 | Barnes et al. |
| 6,597,783 | B1 | 7/2003 | Tada et al. |
| 6,598,016 | B1 | 7/2003 | Zavoli et al. |
| 6,598,021 | B1 | 7/2003 | Shambaugh et al. |
| 6,598,136 | B1 | 7/2003 | Norrod et al. |
| 6,600,734 | B1 | 7/2003 | Gernert et al. |
| 6,600,736 | B1 | 7/2003 | Ball et al. |
| 6,601,014 | B1 | 7/2003 | Dempsey |
| 6,601,027 | B1 | 7/2003 | Wright et al. |
| 6,603,837 | B1 | 8/2003 | Kesanupalli et al. |
| 6,603,854 | B1 | 8/2003 | Judkins et al. |
| 6,606,744 | B1 | 8/2003 | Mikurak |
| 6,611,681 | B2 | 8/2003 | Henderson |
| 6,614,206 | B1 | 9/2003 | Wong et al. |
| 6,614,781 | B1 | 9/2003 | Elliott et al. |
| 6,614,784 | B1 | 9/2003 | Glitho et al. |
| 6,615,209 | B1 | 9/2003 | Gomes et al. |
| 6,615,248 | B1 | 9/2003 | Smith |
| 6,615,249 | B2 | 9/2003 | Schulte Am Hülse |
| 6,625,423 | B1 | 9/2003 | Wang |
| 6,631,186 | B1 | 10/2003 | Adams et al. |
| 6,650,088 | B1 | 11/2003 | Webb et al. |
| 6,653,722 | B2 | 11/2003 | Blalock et al. |
| 6,654,602 | B1 | 11/2003 | Fye et al. |
| 6,662,163 | B1 | 12/2003 | Albayrak et al. |
| 6,668,241 | B2 | 12/2003 | Chen et al. |
| 6,678,355 | B2 | 1/2004 | Eringis et al. |
| 6,678,360 | B1 | 1/2004 | Katz |
| 6,678,718 | B1 | 1/2004 | Khouri et al. |
| 6,680,935 | B1 | 1/2004 | Kung et al. |
| 6,681,001 | B1 | 1/2004 | Clayton et al. |
| 6,690,788 | B1 | 2/2004 | Bauer et al. |
| 6,694,012 | B1 | 2/2004 | Posthuma |
| 6,694,482 | B1 | 2/2004 | Arellano et al. |
| 6,697,458 | B1 | 2/2004 | Kunjibettu |
| 6,697,460 | B2 | 2/2004 | Knott et al. |
| 6,697,467 | B1 | 2/2004 | Schultz et al. |
| 6,697,806 | B1 | 2/2004 | Cook |
| 6,700,972 | B1 | 3/2004 | McHugh et al. |
| 6,704,404 | B1 | 3/2004 | Burnett |
| 6,704,580 | B1 | 3/2004 | Fintel |
| 6,707,789 | B1 | 3/2004 | Arslan et al. |
| 6,711,253 | B1 | 3/2004 | Prabhaker |
| 6,714,631 | B1 | 3/2004 | Martin et al. |
| 6,714,643 | B1 | 3/2004 | Gargeya et al. |
| 6,718,023 | B1 | 4/2004 | Zolotov |
| 6,721,416 | B1 | 4/2004 | Farrell |
| 6,721,882 | B1 | 4/2004 | Mbarki |
| 6,725,199 | B2 | 4/2004 | Brittan et al. |

(56) References Cited

U.S. PATENT DOCUMENTS

| | | |
|---|---|---|
| 6,731,625 B1 | 5/2004 | Eastep et al. |
| 6,731,722 B2 | 5/2004 | Coffey |
| 6,732,151 B1 | 5/2004 | Tobias et al. |
| 6,735,432 B1 | 5/2004 | Jarett et al. |
| 6,738,082 B1 | 5/2004 | Dong et al. |
| 6,738,473 B1 | 5/2004 | Burg et al. |
| 6,744,861 B1 | 6/2004 | Pershan et al. |
| 6,744,877 B1 | 6/2004 | Edwards |
| 6,745,165 B2 | 6/2004 | Lewis et al. |
| 6,751,306 B2 | 6/2004 | Himmel et al. |
| 6,751,591 B1 | 6/2004 | Gorin et al. |
| 6,757,306 B1 | 6/2004 | Klish, II et al. |
| 6,763,095 B1 | 7/2004 | Cermak et al. |
| 6,766,175 B2 | 7/2004 | Uchiyama |
| 6,766,320 B1 | 7/2004 | Wang et al. |
| 6,775,359 B1 | 8/2004 | Ron et al. |
| 6,778,643 B1 | 8/2004 | Bushey et al. |
| 6,782,412 B2 | 8/2004 | Brophy et al. |
| 6,792,096 B2 | 9/2004 | Martin et al. |
| 6,795,806 B1 | 9/2004 | Lewis et al. |
| 6,798,768 B1 | 9/2004 | Gallick et al. |
| 6,798,876 B1 | 9/2004 | Bala |
| 6,801,520 B2 | 10/2004 | Philonenko |
| 6,801,751 B1 | 10/2004 | Wood et al. |
| 6,807,274 B2 | 10/2004 | Joseph et al. |
| 6,823,307 B1 | 11/2004 | Steinbiss et al. |
| 6,826,264 B2 | 11/2004 | Valco et al. |
| 6,831,932 B1 | 12/2004 | Boyle et al. |
| 6,832,224 B2 | 12/2004 | Gilmour |
| 6,836,760 B1 | 12/2004 | Bellegarda et al. |
| 6,842,504 B2 | 1/2005 | Mills et al. |
| 6,847,711 B2 | 1/2005 | Knott et al. |
| 6,847,715 B1 | 1/2005 | Swartz |
| 6,850,611 B1 | 2/2005 | Chalk |
| 6,853,722 B2 | 2/2005 | Joseph et al. |
| 6,853,966 B2 | 2/2005 | Bushey et al. |
| 6,856,806 B1 | 2/2005 | Bosik et al. |
| 6,859,529 B2 | 2/2005 | Duncan et al. |
| 6,871,179 B1 | 3/2005 | Kist et al. |
| 6,871,212 B2 | 3/2005 | Khouri et al. |
| 6,873,693 B1 | 3/2005 | Langseth et al. |
| 6,879,683 B1 | 4/2005 | Fain et al. |
| 6,882,641 B1 | 4/2005 | Gallick et al. |
| 6,882,723 B1 | 4/2005 | Peterson et al. |
| 6,885,734 B1 | 4/2005 | Eberle et al. |
| 6,891,932 B2 | 5/2005 | Bhargava et al. |
| 6,892,083 B2 | 5/2005 | Shostak |
| 6,892,169 B1 | 5/2005 | Campbell et al. |
| 6,895,083 B1 | 5/2005 | Bers et al. |
| 6,895,532 B2 | 5/2005 | Raynham |
| 6,901,366 B1 | 5/2005 | Kuhn et al. |
| 6,907,119 B2 | 6/2005 | Case et al. |
| 6,909,708 B1 | 6/2005 | Krishnaswamy et al. |
| 6,914,974 B2 | 7/2005 | Bonnin |
| 6,915,246 B2 | 7/2005 | Gusler et al. |
| 6,922,689 B2 | 7/2005 | Shtivelman |
| 6,925,155 B2 | 8/2005 | Reynolds et al. |
| 6,925,432 B2 | 8/2005 | Lee et al. |
| 6,937,975 B1 | 8/2005 | Elworthy |
| 6,944,592 B1 | 9/2005 | Pickering |
| 6,944,593 B2 | 9/2005 | Kuzunuki et al. |
| 6,963,983 B2 | 11/2005 | Munson et al. |
| 6,964,023 B2 | 11/2005 | Maes et al. |
| 6,970,554 B1 | 11/2005 | Peterson et al. |
| 6,978,154 B1 | 12/2005 | Ospalak et al. |
| 6,978,163 B2 | 12/2005 | Dyer et al. |
| 6,999,755 B2 | 2/2006 | Park |
| 7,003,079 B1 | 2/2006 | McCarthy et al. |
| 7,006,605 B1 | 2/2006 | Morganstein et al. |
| 7,006,607 B2 | 2/2006 | Garcia |
| 7,013,112 B2 | 3/2006 | Haller et al. |
| 7,013,464 B2 | 3/2006 | Osborn |
| 7,016,849 B2 | 3/2006 | Arnold et al. |
| 7,020,256 B2 | 3/2006 | Jain et al. |
| 7,024,368 B1 | 4/2006 | Matheson |
| 7,027,586 B2 | 4/2006 | Bushey et al. |
| 7,027,975 B1 | 4/2006 | Pazandak et al. |
| 7,031,444 B2 | 4/2006 | Shen et al. |
| 7,031,908 B1 | 4/2006 | Huang et al. |
| 7,035,388 B2 | 4/2006 | Kurosaki |
| 7,039,166 B1 | 5/2006 | Peterson et al. |
| 7,043,435 B2 | 5/2006 | Knott et al. |
| 7,050,936 B2 | 5/2006 | Levy et al. |
| 7,062,029 B2 | 6/2006 | Lund |
| 7,062,505 B2 | 6/2006 | Lane et al. |
| 7,065,201 B2 | 6/2006 | Bushey et al. |
| 7,072,457 B2 | 7/2006 | Brown et al. |
| 7,072,643 B2 | 7/2006 | Pines et al. |
| 7,072,659 B2 | 7/2006 | White, Jr. |
| 7,076,049 B2 | 7/2006 | Bushey et al. |
| 7,076,695 B2 | 7/2006 | McGee et al. |
| 7,092,370 B2 | 8/2006 | Jiang et al. |
| 7,092,888 B1 | 8/2006 | McCarthy et al. |
| 7,092,901 B2 | 8/2006 | Davis et al. |
| 7,095,827 B2 | 8/2006 | Guedalia |
| 7,095,842 B2 | 8/2006 | Brown et al. |
| 7,102,780 B2 | 9/2006 | Watanabe |
| 7,103,165 B2 | 9/2006 | Baniak et al. |
| 7,103,542 B2 | 9/2006 | Doyle |
| 7,106,850 B2 | 9/2006 | Campbell et al. |
| 7,110,512 B2 | 9/2006 | Maropis et al. |
| 7,110,949 B2 | 9/2006 | Bushey et al. |
| 7,124,059 B2 | 10/2006 | Wetzer et al. |
| 7,127,398 B1 | 10/2006 | Yamagishi et al. |
| 7,127,400 B2 | 10/2006 | Koch |
| 7,130,411 B2 | 10/2006 | Brown et al. |
| 7,131,577 B2 | 11/2006 | Obara et al. |
| 7,133,504 B2 | 11/2006 | Fostick |
| 7,133,828 B2 | 11/2006 | Scarano et al. |
| 7,139,390 B2 | 11/2006 | Brown et al. |
| 7,142,652 B2 | 11/2006 | Ho |
| 7,149,525 B2 | 12/2006 | White, Jr. |
| 7,177,397 B2 | 2/2007 | McCalmont et al. |
| 7,177,792 B2 | 2/2007 | Knight et al. |
| 7,184,534 B2 | 2/2007 | Birch et al. |
| 7,184,540 B2 | 2/2007 | Dezonno et al. |
| 7,191,435 B2 | 3/2007 | Lau et al. |
| 7,197,130 B2 | 3/2007 | Paden et al. |
| 7,200,614 B2 | 4/2007 | Reid et al. |
| 7,206,400 B2 | 4/2007 | Dezonno et al. |
| 7,215,745 B2 | 5/2007 | Peters |
| 7,215,759 B2 | 5/2007 | Brown et al. |
| 7,224,792 B2 | 5/2007 | Fusco |
| 7,231,343 B1 | 6/2007 | Treadgold et al. |
| 7,231,384 B2 | 6/2007 | Wu et al. |
| 7,233,908 B1 | 6/2007 | Nelson |
| 7,233,980 B1 | 6/2007 | Holden et al. |
| 7,242,751 B2 | 7/2007 | Bushey et al. |
| 7,245,711 B2 | 7/2007 | Margolis |
| 7,245,716 B2 | 7/2007 | Brown et al. |
| 7,260,537 B2 | 8/2007 | Creamer et al. |
| 7,272,217 B1 | 9/2007 | Kocharlakota |
| 7,277,922 B1 | 10/2007 | Contractor |
| 7,277,924 B1 | 10/2007 | Wichmann et al. |
| 7,287,214 B1 | 10/2007 | Jenkins et al. |
| 7,313,229 B1 | 12/2007 | Sherwood |
| 7,317,787 B2 | 1/2008 | Crockett et al. |
| 7,336,775 B2 | 2/2008 | Tanaka et al. |
| 7,346,152 B2 | 3/2008 | Paden et al. |
| 7,346,507 B1 | 3/2008 | Natarajan et al. |
| 7,349,843 B1 | 3/2008 | Beck |
| 7,353,033 B2 | 4/2008 | Kwon |
| 7,356,475 B2 | 4/2008 | Novack et al. |
| 7,356,685 B2 | 4/2008 | Backman |
| 7,369,653 B2 | 5/2008 | Dezonno et al. |
| 7,370,086 B2 | 5/2008 | Kroeker et al. |
| 7,379,867 B2 | 5/2008 | Chelba et al. |
| 7,379,876 B2 | 5/2008 | Nakata |
| 7,379,886 B1 | 5/2008 | Zaring et al. |
| 7,415,101 B2 | 8/2008 | Bushey et al. |
| 7,421,389 B2 | 9/2008 | Reynolds et al. |
| 7,430,554 B1 | 9/2008 | Heisinger, Jr. |
| 7,443,963 B2 | 10/2008 | Scherer |
| 7,447,299 B1 | 11/2008 | Partovi et al. |

(56) References Cited

U.S. PATENT DOCUMENTS

| | | |
|---|---|---|
| 7,447,662 B2 | 11/2008 | Gibson |
| 7,450,698 B2 | 11/2008 | Bushey et al. |
| 7,454,005 B2 | 11/2008 | Malik |
| 7,460,650 B2 | 12/2008 | Bushey et al. |
| 7,487,095 B2 | 2/2009 | Hill et al. |
| 7,487,112 B2 | 2/2009 | Barnes, Jr. |
| 7,506,241 B2 | 3/2009 | Chefalas et al. |
| 7,512,545 B2 | 3/2009 | Knott et al. |
| 7,516,190 B2 | 4/2009 | Kurganov |
| 7,545,925 B2 | 6/2009 | Williams |
| 7,551,723 B2 | 6/2009 | Mills et al. |
| 7,573,990 B2 | 8/2009 | Galvin |
| 7,580,837 B2 | 8/2009 | Bushey et al. |
| 7,602,899 B1 | 10/2009 | Thenthiruperai |
| 7,616,944 B2 | 11/2009 | Gustavsson et al. |
| 7,620,159 B2 | 11/2009 | Pasquale et al. |
| 7,620,168 B2 | 11/2009 | Ekstrom |
| 7,623,632 B2 | 11/2009 | Bushey et al. |
| 7,627,096 B2 | 12/2009 | Bushey et al. |
| 7,627,109 B2 | 12/2009 | Mitra |
| 7,636,432 B2 | 12/2009 | Bushey et al. |
| 7,647,582 B2 | 1/2010 | Krishnaswamy et al. |
| 7,657,005 B2 | 2/2010 | Chang |
| 7,657,020 B2 | 2/2010 | Bushey et al. |
| 7,660,233 B2 | 2/2010 | Paden et al. |
| 7,660,715 B1 | 2/2010 | Thambiratnam |
| 7,668,889 B2 | 2/2010 | Edwards et al. |
| 7,684,989 B1 | 3/2010 | Collins et al. |
| 7,685,270 B1 | 3/2010 | Vermeulen et al. |
| 7,702,532 B2 | 4/2010 | Vigil |
| 7,720,203 B2 | 5/2010 | Bushey et al. |
| 7,724,889 B2 | 5/2010 | Bushey et al. |
| 7,739,717 B1 | 6/2010 | Kuether et al. |
| 7,751,551 B2 | 7/2010 | Bushey et al. |
| RE41,608 E | 8/2010 | Blair et al. |
| 7,783,029 B2 | 8/2010 | Whitecotten et al. |
| 7,864,942 B2 | 1/2011 | Knott et al. |
| 7,881,656 B2 | 2/2011 | Khedouri et al. |
| 7,900,542 B2 | 3/2011 | Kapolnek |
| 7,933,399 B2 | 4/2011 | Knott et al. |
| 7,936,861 B2 | 5/2011 | Knott et al. |
| 7,939,432 B2 | 5/2011 | Chiang et al. |
| 7,966,176 B2 | 6/2011 | Bushey et al. |
| 8,005,204 B2 | 8/2011 | Bushey et al. |
| 8,051,086 B2 | 11/2011 | Jeffs et al. |
| 8,090,086 B2 | 1/2012 | Chang |
| 8,090,091 B2 | 1/2012 | Ekstrom |
| 8,130,936 B2 | 3/2012 | Kortum et al. |
| 8,139,727 B2 | 3/2012 | Awad et al. |
| 8,165,281 B2 | 4/2012 | Joseph et al. |
| 8,170,197 B2 | 5/2012 | Odinak |
| 8,175,253 B2 | 5/2012 | Knott et al. |
| 8,209,185 B2 * | 6/2012 | Claudatos et al. ............ 704/275 |
| 8,223,954 B2 | 7/2012 | Dallessandro et al. |
| 8,295,469 B2 | 10/2012 | Bushey et al. |
| 8,306,192 B2 | 11/2012 | Bushey et al. |
| 8,321,446 B2 | 11/2012 | Edwards et al. |
| 8,401,851 B2 | 3/2013 | Bushey et al. |
| 8,488,770 B2 | 7/2013 | Mahoney et al. |
| 8,503,662 B2 | 8/2013 | Bushey et al. |
| 2001/0011211 A1 | 8/2001 | Bushey et al. |
| 2001/0014599 A1 | 8/2001 | Henderson |
| 2001/0018672 A1 | 8/2001 | Petters et al. |
| 2001/0019604 A1 | 9/2001 | Joyce et al. |
| 2001/0019955 A1 | 9/2001 | Henderson |
| 2001/0021948 A1 | 9/2001 | Khouri et al. |
| 2001/0024497 A1 | 9/2001 | Campbell et al. |
| 2001/0026608 A1 | 10/2001 | Beyda et al. |
| 2001/0032075 A1 | 10/2001 | Yamamoto |
| 2001/0032211 A1 | 10/2001 | Kuzumaki |
| 2001/0032229 A1 | 10/2001 | Hulls et al. |
| 2001/0033570 A1 | 10/2001 | Makam et al. |
| 2001/0034662 A1 | 10/2001 | Morris |
| 2002/0007303 A1 | 1/2002 | Brookler et al. |
| 2002/0016757 A1 | 2/2002 | Johnson et al. |
| 2002/0023251 A1 | 2/2002 | Nasr et al. |
| 2002/0026394 A1 | 2/2002 | Savage et al. |
| 2002/0032675 A1 | 3/2002 | Williamowski et al. |
| 2002/0046030 A1 | 4/2002 | Haritsa et al. |
| 2002/0049874 A1 | 4/2002 | Kimura |
| 2002/0055975 A1 | 5/2002 | Petrovykh |
| 2002/0056000 A1 | 5/2002 | Coussement |
| 2002/0057678 A1 | 5/2002 | Jiang et al. |
| 2002/0059164 A1 | 5/2002 | Shtivelman |
| 2002/0059169 A1 | 5/2002 | Quarterman et al. |
| 2002/0064149 A1 | 5/2002 | Elliott et al. |
| 2002/0067714 A1 | 6/2002 | Crain et al. |
| 2002/0067820 A1 | 6/2002 | Benson et al. |
| 2002/0073434 A1 | 6/2002 | Pience |
| 2002/0080025 A1 | 6/2002 | Beattie |
| 2002/0087310 A1 | 7/2002 | Lee et al. |
| 2002/0087316 A1 | 7/2002 | Lee et al. |
| 2002/0087385 A1 | 7/2002 | Vincent |
| 2002/0087558 A1 | 7/2002 | Bailey et al. |
| 2002/0091617 A1 | 7/2002 | Keith |
| 2002/0106065 A1 | 8/2002 | Joyce et al. |
| 2002/0111190 A1 | 8/2002 | Harrison et al. |
| 2002/0114432 A1 | 8/2002 | Shaffer et al. |
| 2002/0115480 A1 | 8/2002 | Huang |
| 2002/0116174 A1 | 8/2002 | Lee et al. |
| 2002/0116336 A1 | 8/2002 | Diacakis et al. |
| 2002/0119800 A1 | 8/2002 | Jaggers et al. |
| 2002/0122544 A1 | 9/2002 | Williams et al. |
| 2002/0133394 A1 | 9/2002 | Bushey et al. |
| 2002/0133413 A1 | 9/2002 | Chang et al. |
| 2002/0135618 A1 | 9/2002 | Maes et al. |
| 2002/0137472 A1 | 9/2002 | Quinn et al. |
| 2002/0143548 A1 | 10/2002 | Korall et al. |
| 2002/0156699 A1 | 10/2002 | Gray et al. |
| 2002/0165732 A1 | 11/2002 | Ezzeddine et al. |
| 2002/0169606 A1 | 11/2002 | Bantz et al. |
| 2002/0178005 A1 | 11/2002 | Dusan et al. |
| 2002/0181442 A1 | 12/2002 | Rajani |
| 2002/0188438 A1 | 12/2002 | Knight et al. |
| 2002/0196277 A1 | 12/2002 | Bushey et al. |
| 2002/0198714 A1 | 12/2002 | Zhou |
| 2002/0198967 A1 | 12/2002 | Iwanojko et al. |
| 2003/0003900 A1 | 1/2003 | Goss et al. |
| 2003/0007609 A1 | 1/2003 | Yuen et al. |
| 2003/0007620 A1 | 1/2003 | Elsey et al. |
| 2003/0009339 A1 | 1/2003 | Yuen et al. |
| 2003/0014335 A1 | 1/2003 | Lecheler-Moore et al. |
| 2003/0018659 A1 | 1/2003 | Fuks et al. |
| 2003/0026409 A1 | 2/2003 | Bushey et al. |
| 2003/0028498 A1 | 2/2003 | Hayes-Roth |
| 2003/0035381 A1 | 2/2003 | Chen et al. |
| 2003/0035516 A1 | 2/2003 | Guedalia |
| 2003/0039242 A1 | 2/2003 | Moore, Jr. |
| 2003/0048195 A1 | 3/2003 | Trossen |
| 2003/0064720 A1 | 4/2003 | Valins et al. |
| 2003/0069937 A1 | 4/2003 | Khouri et al. |
| 2003/0092451 A1 | 5/2003 | Holloway et al. |
| 2003/0095651 A1 | 5/2003 | Book et al. |
| 2003/0097428 A1 | 5/2003 | Afkhami et al. |
| 2003/0103619 A1 | 6/2003 | Brown et al. |
| 2003/0108183 A1 | 6/2003 | Dhir et al. |
| 2003/0112956 A1 | 6/2003 | Brown et al. |
| 2003/0114105 A1 | 6/2003 | Haller et al. |
| 2003/0115257 A1 | 6/2003 | Zyarko et al. |
| 2003/0115289 A1 | 6/2003 | Chinn et al. |
| 2003/0118159 A1 | 6/2003 | Shen et al. |
| 2003/0125075 A1 | 7/2003 | Klovborg |
| 2003/0125945 A1 | 7/2003 | Doyle |
| 2003/0130841 A1 | 7/2003 | Bangalore et al. |
| 2003/0130864 A1 | 7/2003 | Ho et al. |
| 2003/0133421 A1 | 7/2003 | Sundar et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0149653 A1 | 8/2003 | Penney et al. |
| 2003/0154184 A1 | 8/2003 | Chee et al. |
| 2003/0156133 A1 | 8/2003 | Martin et al. |
| 2003/0165223 A1 | 9/2003 | Timmins et al. |
| 2003/0179876 A1 | 9/2003 | Fox et al. |

(56) References Cited

U.S. PATENT DOCUMENTS

| | | |
|---|---|---|
| 2003/0181202 A1 | 9/2003 | Link, II et al. |
| 2003/0187632 A1 | 10/2003 | Menich |
| 2003/0187732 A1 | 10/2003 | Seta |
| 2003/0187773 A1 | 10/2003 | Santos et al. |
| 2003/0187865 A1 | 10/2003 | Frisina |
| 2003/0191648 A1 | 10/2003 | Knott et al. |
| 2003/0194063 A1 | 10/2003 | Martin et al. |
| 2003/0195753 A1 | 10/2003 | Homuth |
| 2003/0200298 A1 | 10/2003 | Su et al. |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0212558 A1 | 11/2003 | Matula |
| 2003/0228007 A1 | 12/2003 | Kurosaki |
| 2003/0235282 A1 | 12/2003 | Sichelman et al. |
| 2003/0235287 A1 | 12/2003 | Margolis |
| 2004/0005047 A1 | 1/2004 | Joseph et al. |
| 2004/0006473 A1 | 1/2004 | Mills et al. |
| 2004/0018774 A1 | 1/2004 | Long et al. |
| 2004/0028213 A1 | 2/2004 | Goss |
| 2004/0030649 A1 | 2/2004 | Nelson et al. |
| 2004/0032484 A1 | 2/2004 | Halttunen |
| 2004/0032862 A1 | 2/2004 | Schoeneberger et al. |
| 2004/0032935 A1 | 2/2004 | Mills et al. |
| 2004/0037401 A1 | 2/2004 | Dow et al. |
| 2004/0042592 A1 | 3/2004 | Knott et al. |
| 2004/0044950 A1 | 3/2004 | Mills et al. |
| 2004/0047453 A1 | 3/2004 | Fraser |
| 2004/0057570 A1* | 3/2004 | Power et al. ............. 379/265.13 |
| 2004/0063424 A1 | 4/2004 | Silberstein et al. |
| 2004/0066401 A1 | 4/2004 | Bushey et al. |
| 2004/0066416 A1 | 4/2004 | Knott et al. |
| 2004/0066776 A1 | 4/2004 | Ishidoshiro |
| 2004/0072544 A1 | 4/2004 | Alexis |
| 2004/0073569 A1 | 4/2004 | Knott et al. |
| 2004/0083206 A1 | 4/2004 | Wu et al. |
| 2004/0083479 A1 | 4/2004 | Bondarenko et al. |
| 2004/0088285 A1 | 5/2004 | Martin et al. |
| 2004/0101127 A1 | 5/2004 | Dezonno et al. |
| 2004/0103017 A1 | 5/2004 | Reed et al. |
| 2004/0109555 A1 | 6/2004 | Williams |
| 2004/0111269 A1 | 6/2004 | Koch |
| 2004/0111479 A1 | 6/2004 | Borden et al. |
| 2004/0116073 A1 | 6/2004 | Mauney et al. |
| 2004/0117185 A1 | 6/2004 | Scarano et al. |
| 2004/0120473 A1 | 6/2004 | Birch et al. |
| 2004/0120492 A1 | 6/2004 | Lew et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0127241 A1 | 7/2004 | Shostak |
| 2004/0128624 A1 | 7/2004 | Arellano et al. |
| 2004/0156491 A1 | 8/2004 | Reding et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0162724 A1 | 8/2004 | Hill et al. |
| 2004/0174980 A1 | 9/2004 | Knott et al. |
| 2004/0199394 A1 | 10/2004 | Kuzunuki et al. |
| 2004/0202309 A1 | 10/2004 | Baggenstoss et al. |
| 2004/0203374 A1 | 10/2004 | Zilliacus |
| 2004/0204056 A1 | 10/2004 | Phelps, III |
| 2004/0213212 A1 | 10/2004 | Reding et al. |
| 2004/0230438 A1 | 11/2004 | Pasquale et al. |
| 2004/0230506 A1 | 11/2004 | Casco-Arias et al. |
| 2004/0240635 A1 | 12/2004 | Bushey et al. |
| 2004/0243568 A1 | 12/2004 | Wang et al. |
| 2004/0259541 A1 | 12/2004 | Hicks, III et al. |
| 2004/0264677 A1 | 12/2004 | Horvitz et al. |
| 2004/0266425 A1 | 12/2004 | Gonsalves et al. |
| 2005/0008141 A1 | 1/2005 | Kortum et al. |
| 2005/0015197 A1 | 1/2005 | Ohtsuji et al. |
| 2005/0015256 A1 | 1/2005 | Kargman |
| 2005/0015744 A1 | 1/2005 | Bushey et al. |
| 2005/0018825 A1 | 1/2005 | Ho |
| 2005/0020236 A1 | 1/2005 | Mauney et al. |
| 2005/0021567 A1 | 1/2005 | Holenstein et al. |
| 2005/0027535 A1 | 2/2005 | Martin et al. |
| 2005/0032475 A1 | 2/2005 | Mauney et al. |
| 2005/0041647 A1 | 2/2005 | Stinnie |
| 2005/0041796 A1 | 2/2005 | Joseph et al. |
| 2005/0047578 A1 | 3/2005 | Knott et al. |
| 2005/0049874 A1 | 3/2005 | Coffman et al. |
| 2005/0049940 A1 | 3/2005 | Tengler et al. |
| 2005/0054335 A1 | 3/2005 | Pearson et al. |
| 2005/0055216 A1 | 3/2005 | Bushey et al. |
| 2005/0055599 A1 | 3/2005 | Bravo et al. |
| 2005/0058264 A1 | 3/2005 | Joseph et al. |
| 2005/0060200 A1 | 3/2005 | Kobylevsky et al. |
| 2005/0063360 A1 | 3/2005 | Lowmaster |
| 2005/0063528 A1 | 3/2005 | Pearson et al. |
| 2005/0064853 A1 | 3/2005 | Radpour |
| 2005/0064855 A1 | 3/2005 | Russell |
| 2005/0066416 A1 | 3/2005 | Ma |
| 2005/0075894 A1 | 4/2005 | Bushey et al. |
| 2005/0075984 A1 | 4/2005 | Bourrieres et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0081696 A1 | 4/2005 | Kapolnek |
| 2005/0096024 A1 | 5/2005 | Bicker et al. |
| 2005/0097034 A1 | 5/2005 | Loeger et al. |
| 2005/0102141 A1 | 5/2005 | Chikuri |
| 2005/0111653 A1 | 5/2005 | Joyce et al. |
| 2005/0113077 A1 | 5/2005 | Bushnell et al. |
| 2005/0125232 A1 | 6/2005 | Gadd |
| 2005/0131708 A1 | 6/2005 | Palma et al. |
| 2005/0131892 A1 | 6/2005 | Knott et al. |
| 2005/0132262 A1 | 6/2005 | Bushey et al. |
| 2005/0135575 A1 | 6/2005 | Haskey et al. |
| 2005/0135595 A1 | 6/2005 | Bushey et al. |
| 2005/0141479 A1 | 6/2005 | Ozugur et al. |
| 2005/0141692 A1 | 6/2005 | Scherer et al. |
| 2005/0141694 A1 | 6/2005 | Wengrovitz |
| 2005/0147218 A1 | 7/2005 | Novack et al. |
| 2005/0152530 A1 | 7/2005 | Pence et al. |
| 2005/0152531 A1 | 7/2005 | Hamilton, II et al. |
| 2005/0161002 A1 | 7/2005 | Robinson |
| 2005/0169441 A1 | 8/2005 | Yacoub et al. |
| 2005/0169449 A1 | 8/2005 | Coughlin, Jr. et al. |
| 2005/0169453 A1 | 8/2005 | Knott et al. |
| 2005/0171877 A1 | 8/2005 | Weiss |
| 2005/0172033 A1 | 8/2005 | Mathew et al. |
| 2005/0172148 A1 | 8/2005 | Ying |
| 2005/0195961 A1 | 9/2005 | Pasquale et al. |
| 2005/0201531 A1 | 9/2005 | Kanter et al. |
| 2005/0201547 A1 | 9/2005 | Burg et al. |
| 2005/0210101 A1 | 9/2005 | Janik |
| 2005/0210143 A1 | 9/2005 | Wengrovitz |
| 2005/0213743 A1 | 9/2005 | Huet et al. |
| 2005/0240411 A1 | 10/2005 | Yacoub |
| 2005/0254632 A1 | 11/2005 | Pasquale et al. |
| 2005/0273781 A1 | 12/2005 | Nakamura et al. |
| 2005/0277431 A1 | 12/2005 | White |
| 2005/0278655 A1 | 12/2005 | Sims et al. |
| 2005/0282582 A1 | 12/2005 | Slotznick |
| 2005/0288927 A1 | 12/2005 | Kim et al. |
| 2006/0002540 A1 | 1/2006 | Kreiner et al. |
| 2006/0003806 A1 | 1/2006 | Weber et al. |
| 2006/0018443 A1 | 1/2006 | Knott et al. |
| 2006/0023863 A1 | 2/2006 | Joseph et al. |
| 2006/0025995 A1 | 2/2006 | Erhart et al. |
| 2006/0026049 A1 | 2/2006 | Joseph et al. |
| 2006/0027097 A1 | 2/2006 | Lee |
| 2006/0031587 A1 | 2/2006 | Paterson et al. |
| 2006/0036437 A1 | 2/2006 | Bushey et al. |
| 2006/0039547 A1 | 2/2006 | Klein et al. |
| 2006/0050865 A1 | 3/2006 | Kortum et al. |
| 2006/0056287 A1 | 3/2006 | Paden et al. |
| 2006/0056406 A1 | 3/2006 | Bouchard et al. |
| 2006/0062375 A1 | 3/2006 | Pasquale et al. |
| 2006/0072737 A1 | 4/2006 | Paden et al. |
| 2006/0073013 A1 | 4/2006 | Emigholz et al. |

(56) References Cited

U.S. PATENT DOCUMENTS

| | | |
|---|---|---|
| 2006/0083357 A1 | 4/2006 | Howell et al. |
| 2006/0085538 A1 | 4/2006 | Newman et al. |
| 2006/0093097 A1 | 5/2006 | Chang |
| 2006/0100998 A1 | 5/2006 | Edwards et al. |
| 2006/0109974 A1 | 5/2006 | Paden et al. |
| 2006/0109976 A1 | 5/2006 | Sundaram et al. |
| 2006/0115070 A1 | 6/2006 | Bushey et al. |
| 2006/0126808 A1 | 6/2006 | Dallessandro et al. |
| 2006/0126811 A1 | 6/2006 | Bushey et al. |
| 2006/0133587 A1 | 6/2006 | Bushey et al. |
| 2006/0146806 A1 | 7/2006 | Khuc et al. |
| 2006/0153345 A1 | 7/2006 | Bushey et al. |
| 2006/0159116 A1 | 7/2006 | Gerszberg et al. |
| 2006/0159240 A1 | 7/2006 | Bushey et al. |
| 2006/0161431 A1 | 7/2006 | Bushey et al. |
| 2006/0165057 A1 | 7/2006 | Paden et al. |
| 2006/0165066 A1 | 7/2006 | Campbell et al. |
| 2006/0176824 A1 | 8/2006 | Laver et al. |
| 2006/0177040 A1 | 8/2006 | Mitra |
| 2006/0182252 A1 | 8/2006 | Harris et al. |
| 2006/0187954 A1 | 8/2006 | Braschi et al. |
| 2006/0188075 A1 | 8/2006 | Peterson |
| 2006/0188087 A1 | 8/2006 | Kortum et al. |
| 2006/0190424 A1 | 8/2006 | Beale et al. |
| 2006/0195312 A1 | 8/2006 | Knight et al. |
| 2006/0198505 A1 | 9/2006 | Kortum et al. |
| 2006/0215831 A1 | 9/2006 | Knott et al. |
| 2006/0215833 A1 | 9/2006 | Mahoney et al. |
| 2006/0251094 A1 | 11/2006 | Van Vleck et al. |
| 2006/0251229 A1 | 11/2006 | Gorti et al. |
| 2006/0256932 A1 | 11/2006 | Bushey et al. |
| 2006/0256952 A1 | 11/2006 | Rogers et al. |
| 2006/0256956 A1 | 11/2006 | Lee et al. |
| 2006/0285535 A1 | 12/2006 | Metcalf et al. |
| 2006/0291642 A1 | 12/2006 | Bushey et al. |
| 2006/0291644 A1 | 12/2006 | Ellinwood et al. |
| 2007/0019800 A1 | 1/2007 | Bushey et al. |
| 2007/0025528 A1 | 2/2007 | Knott et al. |
| 2007/0025542 A1 | 2/2007 | Bushey et al. |
| 2007/0041551 A1 | 2/2007 | Whitecotten et al. |
| 2007/0047718 A1 | 3/2007 | Idler et al. |
| 2007/0047720 A1 | 3/2007 | Brandt et al. |
| 2007/0047728 A1 | 3/2007 | Raju et al. |
| 2007/0116230 A1 | 5/2007 | Brandt et al. |
| 2007/0136060 A1 | 6/2007 | Hennecke et al. |
| 2007/0192362 A1 | 8/2007 | Caballero et al. |
| 2007/0206734 A1 | 9/2007 | Hagale et al. |
| 2007/0206772 A1 | 9/2007 | Sato et al. |
| 2007/0260539 A1 | 11/2007 | Delinsky et al. |
| 2008/0008308 A1 | 1/2008 | Knott et al. |
| 2008/0048861 A1 | 2/2008 | Naidoo et al. |
| 2008/0049779 A1 | 2/2008 | Hopmann et al. |
| 2008/0084975 A1 | 4/2008 | Schwartz |
| 2008/0152094 A1 | 6/2008 | Perlmutter |
| 2008/0154601 A1 | 6/2008 | Stifelman et al. |
| 2008/0154773 A1 | 6/2008 | Ranzini et al. |
| 2008/0273687 A1 | 11/2008 | Knott et al. |
| 2009/0019141 A1 | 1/2009 | Bush et al. |
| 2009/0067590 A1 | 3/2009 | Bushey et al. |
| 2009/0171799 A1 | 7/2009 | Ying |
| 2009/0287484 A1 | 11/2009 | Bushey et al. |
| 2010/0040207 A1 | 2/2010 | Bushey et al. |
| 2010/0054449 A1 | 3/2010 | Bushey et al. |
| 2010/0232595 A1 | 9/2010 | Bushey et al. |
| 2013/0010947 A1 | 1/2013 | Bushey et al. |
| 2013/0151253 A1 | 6/2013 | Bushey et al. |
| 2013/0230162 A1 | 9/2013 | Bushey |
| 2013/0294596 A1 | 11/2013 | Bushey et al. |

FOREIGN PATENT DOCUMENTS

| | | | |
|---|---|---|---|
| EP | 0424015 | B1 | 4/1991 |
| EP | 0671859 | A2 | 9/1995 |
| EP | 0713345 | A2 | 5/1996 |
| EP | 0876652 | A4 | 6/1999 |
| GB | 2305078 | A | 3/1997 |
| JP | 08163646 | A | 6/1996 |
| JP | 08172673 | A | 7/1996 |
| JP | 08294168 | A | 11/1996 |
| JP | 08294170 | A | 11/1996 |
| JP | 08317468 | A | 11/1996 |
| JP | 08322087 | A | 12/1996 |
| JP | 09037345 | A | 2/1997 |
| JP | 09055981 | A | 2/1997 |
| JP | 09084117 | A | 3/1997 |
| JP | 09098475 | A | 4/1997 |
| WO | 9405101 | A1 | 3/1994 |
| WO | 9726612 | A1 | 7/1997 |
| WO | 0137539 | A2 | 5/2001 |
| WO | 0137539 | A3 | 5/2001 |
| WO | 2004017584 | A1 | 2/2004 |
| WO | 2004049222 | A2 | 6/2004 |
| WO | 2005006713 | A3 | 1/2005 |
| WO | 2005036330 | A3 | 4/2005 |
| WO | 2005048577 | A1 | 5/2005 |
| WO | 2006014195 | A3 | 2/2006 |
| WO | 2006062707 | A2 | 6/2006 |
| WO | 2006062854 | A2 | 6/2006 |
| WO | 2006065526 | A2 | 6/2006 |
| WO | 2007021444 | A3 | 2/2007 |

OTHER PUBLICATIONS

International Search Report and Written Opinion of the International Search Authority for International Application No. PCT/US04/16017 from the International Searching Authority (EPO), mailed Aug. 16, 2005, 5 pages.

International Search Report and Written Opinion of the International Search Authority for International Application No. PCT/US04/28260 from the International Searching Authority (EPO), mailed on Sep. 30, 2005, 7 pages.

International Search Report and Written Opinion of the International Search Authority for International Application No. PCT/US04/34239 from the International Searching Authority (EPO), mailed on Feb. 17, 2005, 7 pages.

International Search Report and Written Opinion of the International Search Authority for International Application No. PCT/US05/16449 from the International Searching Authority (EPO), mailed on Apr. 10, 2006, 7 pages.

International Search Report and Written Opinion of the International Search Authority for International Application No. PCT/US05/41473 from the International Searching Authority (EPO), mailed on Jun. 28, 2006, 4 pages.

International Search Report and Written Opinion of the International Search Authority for International Application No. PCT/US05/43126 from the International Searching Authority (EPO), mailed on Nov. 22, 2006, 4 pages.

International Search Report and Written Opinion of the International Search Authority for International Application No. PCT/US06/28349 from the International Searching Authority (EPO), mailed on Aug. 13, 2007, 5 pages.

"www.yahoo.com" from Dec. 12, 1998 as archived in the Internet archive (www.archive.org), 2 pages.

"Specification of the Bluetooth System: Profiles", Bluetooth, Part K:1 Generic Access Profile, Dec. 1, 1999, Specification vol. 2, Version 1.0 B, pp. 1-60.

Charny, B., "VoIP Phone Maker Plans a Cell Hybrid", http://news.cnet.com/2100-7352_3-5086177.html, CNET News, Oct. 3, 2003, pp. 1-2.

Chavez, A. et al., "Kasbah: An Agent Marketplace for Buying and Selling Goods", PAAM 96—Proceedings of the First International Conference on the Practical Application of Intelligent Agents and Multi-Agent Technology, Apr. 1996, Practical Application Co., pp. 75-90.

Crowston, K. et al., "The Effects of Linking on Genres of Web Documents", HICSS '99 Proceedings of the Thirty-Second Annual Hawaii International Conference on System Sciences—vol. 2, 1999, vol. 2, IEEE Computer Society, Washington, DC, p. 2006 (1-11).

(56) References Cited

OTHER PUBLICATIONS

Faiks, A. et al., "Gaining User Insight: A Case Study Illustrating the Card Sort Technique", Jul. 2000, College & Research Libraries, vol. 61, No. 4, pp. 349-357.

Haartsen, J., "Bluetooth: A New Radio Interface Providing Ubiquitous Connectivity", 2000 IEEE 51st Vehicular Technology Conference Proceedings, 2000, vol. 1, IEEE, Piscataway, NJ, pp. 107-111.

Moldovan, D. et al., "Using WordNet and Lexical Operators to Improve Internet Searches", IEEE Internet Computing, Jan.-Feb. 2000, vol. 4, Issue 1, IEEE Computer Society, Piscataway, NJ, pp. 34-43.

Ogino, T. et al., "Study of an Efficient Server Selection Method for Widely Distributed Web Server Networks," iNet 2000 Proceedings, www.isoc.org/inet2000/cdproceedings/1g/index.htm, Jun. 30, 2000, INet Japan Computer Society, 19 pages.

Schneiderman, R., "Bluetooth's Slow Dawn", IEEE Spectrum, Nov. 2000, vol. 37, Issue 11, IEEE Press, Piscataway NJ, pp. 61-65.

\* cited by examiner

| SYNONYM TABLE ||
|---|---|
| *SPEECH* | *SYNONYM* |
| NEED HELP USING | HOW TO USE |
| I'D LIKE TO GET | ACQUIRE |
| GET OUT OF | CANCEL |
| DISCONNECT | CANCEL |
| I'D LIKE TO KNOW | INQUIRE |
| PROVIDE ME WITH | ACQUIRE |
| GET ME HELP | HOW TO USE |
| HOW MUCH | INQUIRE |

FIG. 4

| OBJECTS | ACTIONS |||||| 
|---|---|---|---|---|---|---|
|  | ACQUIRE | CANCEL | CHANGE | INQUIRE | INFORM | HOW TO USE |
| DSL | X001 | X002 | X003 | X004 |  | X005 |
| BASIC SERVICE | X006 | X007 |  | X008 |  | X009 |
| CALL NOTES | X010 | X011 |  |  |  | X012 |
| CALLER ID |  |  | X013 | X014 |  |  |
| BILL |  |  |  | X015 | X016 |  |
| PAYMENT |  | X015 | X016 | X032 |  | X033 |
| OTHER PROVIDERS |  |  |  | X034 |  |  |
| COUPONS SPECIALS |  |  |  | X035 |  |  |
| NAME / NUMBER |  |  |  | X036 |  |  |
| STORE LOCATIONS |  |  |  | X038 | X039 |  |

FIG. 5

SYSTEM AND METHOD FOR PROCESSING SPEECH

CLAIM OF PRIORITY

This application is a Continuation Patent Application of, and claims priority from, U.S. patent application Ser. No. 12/750,792, filed on Mar. 31, 2010, and entitled "SYSTEM AND METHOD FOR PROCESSING SPEECH," which is a continuation of U.S. Pat. No. 7,720,203, filed on Jun. 1, 2007, which is a continuation of U.S. Pat. No. 7,242,751, filed on Dec. 6, 2004, each of which is hereby incorporated by reference in its entirety.

FIELD OF THE DISCLOSURE

The present disclosure relates generally to speech recognition and, more particularly, to speech recognition-enabled automatic call routing service systems and methods.

BACKGROUND

Speech recognition systems are specialized computers that are configured to process and recognize human speech and may also take action or carry out further processes. Developments in speech recognition technologies support "natural language" type interactions between automated systems and users. A natural language interaction allows a person to speak naturally. Voice recognition systems can react responsively to a spoken request. An application of natural language processing is speech recognition with automatic call routing (ACR). A goal of an ACR application is to determine why a customer is calling a service center and to route the customer to an appropriate agent or destination for servicing a customer request. Speech recognition technology generally allows an ACR application to recognize natural language statements so that the caller does not have to rely on a menu system. Natural language systems allow the customer to state the purpose of their call "in their own words."

In order for an ACR application to properly route calls, the ACR system attempts to interpret the intent of the customer and selects a routing destination. When a speech recognition system partially understands or misunderstands the caller's intent, significant problems can result. Further, even in touch-tone ACR systems, the caller can depress the wrong button and have a call routed to a wrong location. When a caller is routed to an undesired system and realizes that there is a mistake, the caller often hangs up and retries the call. Another common problem occurs when a caller gets "caught" or "trapped" in a menu that does not provide an acceptable selection to exit the menu. Trapping a caller or routing the caller to an undesired location leads to abandoned calls. Most call routing systems handle a huge volume of calls and, even if a small percentage of calls are abandoned, the costs associated with abandoned calls are significant.

Current speech recognition systems, such as those sold by Speechworks™, operate utilizing a dynamic semantic model. The semantic model recognizes human speech and creates multiple word strings based on phonemes that the semantic model can recognize. The semantic model assigns probabilities to each of the word strings using rules and other criteria. However, the semantic model has extensive tables and business rules, many that are "learned" by the speech recognition system. The learning portion of the system is difficult to set up and modify. Further, changing the word string tables in the semantic model can be an inefficient process. For example, when a call center moves or is assigned a different area code, the semantic system is retrained using an iterative process.

BRIEF DESCRIPTION OF THE DRAWINGS

FIG. 4 is a table that depicts speech input and mapped synonym terms; and

FIG. 5 is a table illustrating action-object pairs and call destinations relating to the action object pairs.

DETAILED DESCRIPTION

In a particular embodiment, a speech recognition system includes a speech recognition interface and a processor coupled to the speech recognition interface. The processor converts speech received from a call at the speech recognition interface to at least one word string. The processor parses each word string of the at least one word string into first objects and first actions. The processor accesses a synonym table to determine second objects and second actions based on the first objects and the first actions. The processor also selects a preferred object and a preferred action from the second objects and the second actions.

In a particular embodiment, a computerized method of processing speech includes determining a plurality of objects based on speech input and determining a plurality of actions based on the speech input. The computerized method includes comparing the objects and the actions with entries in a synonym table to determine synonym objects and synonym actions. The computerized method includes selecting a preferred object and a preferred action from the synonym objects and the synonym actions. The computerized method also includes routing a call that provided the speech input to a destination based on the preferred object and the preferred action.

In a particular embodiment, a computerized method includes transforming speech input from a caller into a plurality of word strings. The computerized method includes converting the word strings into pairs of objects and actions. The computerized method includes determining from a synonym table synonym pairs from the pairs. The computerized method also includes selecting a preferred pair from the synonym pairs.

Particular systems and particular methods are disclosed for processing a call by receiving caller input in a speech format and utilizing phonemes to convert the speech input into word strings. The word strings are then converted into at least one object and at least one action. A synonym table is utilized to determine actions and objects. Objects generally represent nouns and adjective-noun combinations while actions generally represent verbs and adverb-verb combinations. The synonym table stores natural language phrases and their relationship with actions and objects. The actions and objects are utilized to determine a routing destination utilizing a routing table. The call is then routed based on the routing table. During the process, the word string, the actions, the objects and an action-object pair can be assigned a probability value. The probability value represents a probability that the word string, the action, or the object accurately represent the purpose or intent of the caller.

Figure 1:
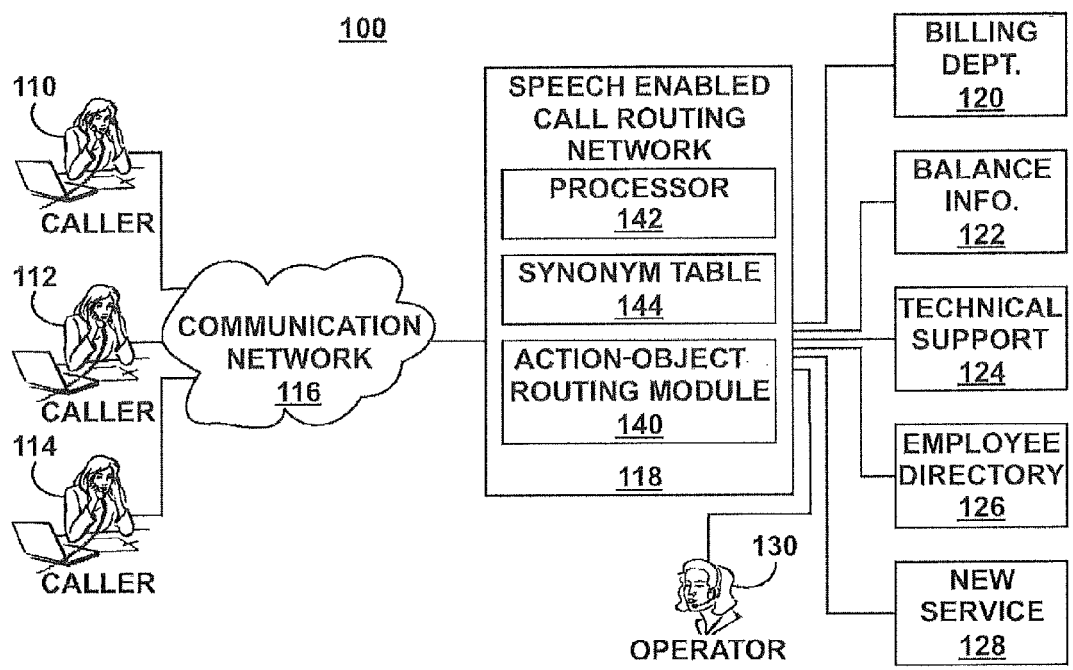
FIG. 1 illustrates a simplified configuration of a telecommunication system.

Referring to FIG. 1, an illustrated communications system 100 that includes a call routing support system is shown. The communications system 100 includes a speech enabled call routing system (SECRS) 118, such as an interactive voice response system having a speech recognition module. The system 100 includes a plurality of potential call destinations. Illustrative call destinations shown include service departments, such as billing department 120, balance information 122, technical support 124, employee directory 126, and new customer service departments 128. The communication network 116 receives calls from a variety of callers, such as the illustrated callers 110, 112, and 114. In a particular embodiment, the communication network 116 may be a public telephone network or may be provided by a voice over Internet protocol (VoIP) type network. The SECRS 118 may include components, such as a processor 142, a synonym table 144, and an action-object routing module 140. The SECRS 118 is coupled to and may route calls to any of the destinations, as shown. In addition, the SECRS 118 may route calls to an agent, such as the illustrated live operator 130. An illustrative embodiment of the SECRS 118 may be a call center having a plurality of agent terminals attached (not shown). Thus, while only a single operator 130 is shown, it should be understood that a plurality of different agent terminals or types of terminals may be coupled to the SECRS 118, such that a variety of agents may service incoming calls. In addition, the SECRS 118 may be an automated call routing system. In a particular embodiment, the action-object routing module 140 includes an action-object lookup table for matching action-object pairs to desired call routing destinations.

Figure 2:
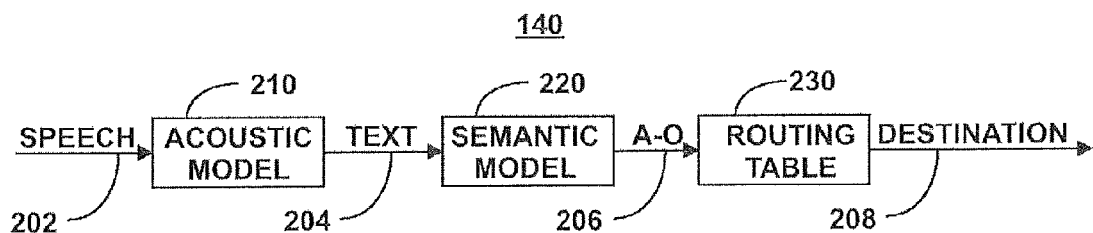
FIG. 2 is a general diagram that illustrates a method of routing calls.

Referring to FIG. 2, an illustrative embodiment of an action-object routing module 140 is shown. In this particular embodiment, the action-object routing module 140 includes an acoustic processing model 210, semantic processing model 220, and action-object routing table 230. The acoustic model 210 receives speech input 202 and provides text 204 as its output. Semantic model 220 receives text 204 from the acoustic model 210 and produces an action-object pair 206 that is provided to the action-object routing table 230. The routing table 230 receives action-object pairs 206 from semantic model 220 and produces a desired call routing destination 208. Based on the call routing destination 208, a call received at a call routing network 118 may be routed to a final destination, such as the billing department 120 or the technical support service destination 124 depicted in FIG. 1. In a particular embodiment, the action-object routing table 230 may be a look up table or a spreadsheet, such as Microsoft Excel™.

Figure 3:
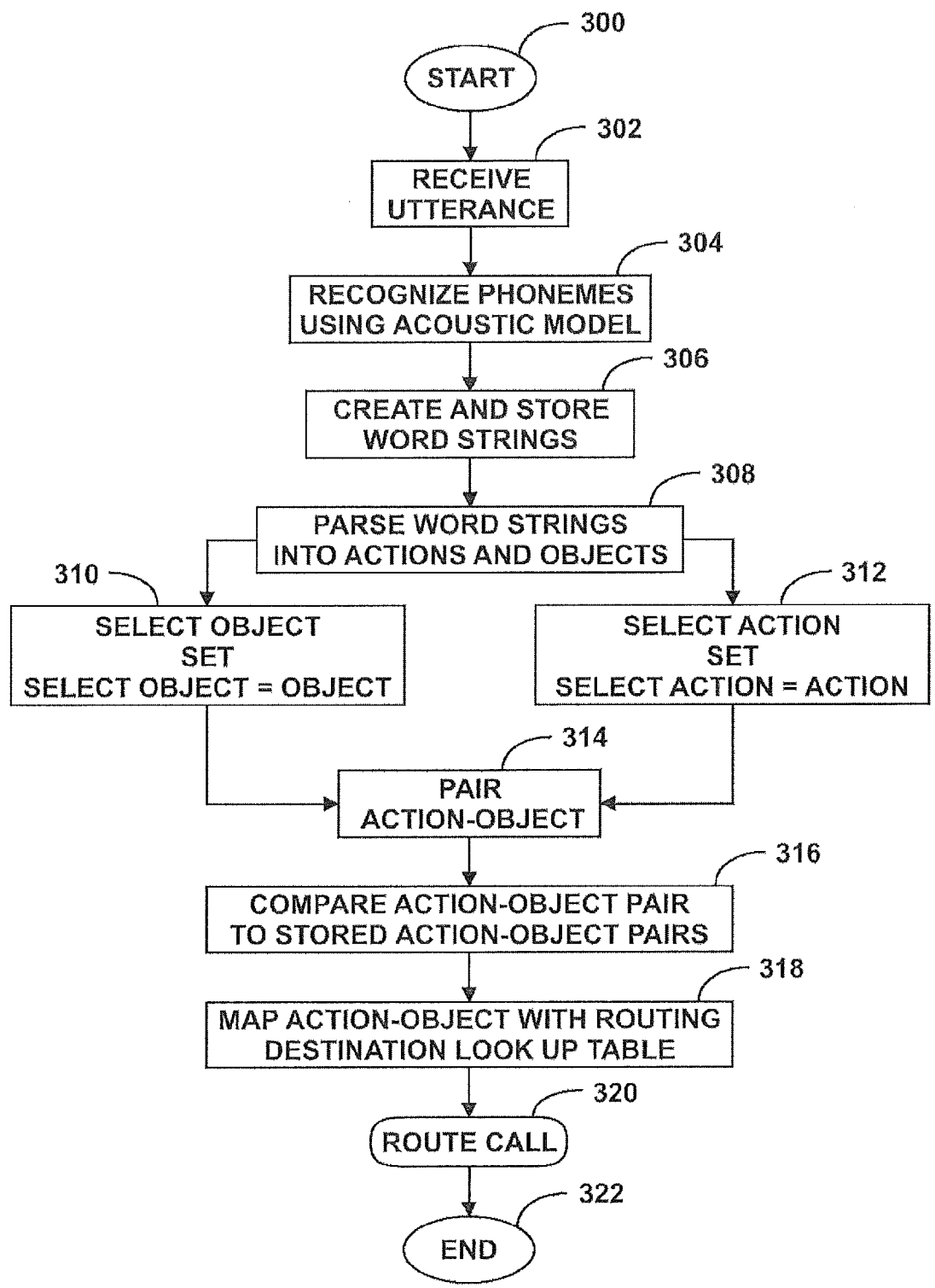
FIG. 3 is a flow diagram that illustrates a method of processing and routing calls.

Referring to FIG. 3, an illustrative embodiment of a method of processing a call using an automated call routing system is illustrated. The method starts at 300 and proceeds to step 302 where a speech input signal, such as a received utterance, is received or detected. Using phonemes, the received speech input is converted into a plurality of word strings or text in accordance with an acoustic model, as shown at steps 304 and 306. In a particular embodiment, probability values are assigned to word strings based on established rules and the coherency of the word string. Next, at step 308, the word strings are parsed into objects and actions. Objects generally represent nouns and adjective-noun combinations while actions generally represent verbs and adverb-verb combinations. The actions and objects are assigned confidence values or probability values based on how likely they are to reflect the intent of the caller. In a particular embodiment a probability value or confidence level for the detected action and the detected object is determined utilizing the probability value of the word string used to create the selected action and the selected object.

Many possible actions and objects may be detected or created from the word strings. The method attempts to determine and select a most probable action and object from a list of preferred objects and actions. To aid in this resolution a synonym table, such as the synonym table of FIG. 4 can be utilized to convert detected actions and objects into preferred actions and objects. Thus, detected objects and actions are converted to preferred actions and objects and assigned a confidence level. The process of utilizing the synonym table can alter the confidence level. The synonym table stores natural language phrases and their relationship with a set of actions and objects. Natural language spoken by the caller can be compared to the natural language phrases in the table. Using the synonym table, the system and method maps portions of the natural phrases to detected objects and maps portions of the natural spoken phrase to detected actions. Thus, the word strings are converted into objects and actions, at steps 310 and 312 respectively and the selected action and object are set to the action and object that will be utilized to route the call. The action and object with the highest confidence value are selected based on many criteria such as confidence value, business rules, etc., in steps 310 and 312.

At step 310 and 312, multiple actions and objects can be detected and provided with a probability value according to the likelihood that a particular action or object identifies a customer's intent and thus will lead to a successful routing of the call and a dominant action and dominant object are determined. Next, at step 314, dominant objects and actions are paired together. At step 316, a paired action-object is compared to an action-object routing table, such as the action object routing table of FIG. 5. The action-object routing table in FIG. 5 is generally a predetermined list. When objects and actions find a match, then the destination of the call can be selected at step 318, and the call is routed, at step 320. The process ends at step 322.

Referring to FIG. 4, as an example, it is beneficial to convert word strings such as "I want to have" to actions such as "get." This substantially reduces the size of the routing table. When a call destination has a phone number change, a single entry in the routing table may accommodate the change. Prior systems may require locating numerous entries in a voluminous database, or retraining a sophisticated system. In accordance with the present system, dozens of differently expressed or "differently spoken" inputs that have the same caller intent can be converted to a single detected action-object pair. Further, improper and informal sentences as well as slang can be connected to an action-object pair that may not bear phonetic resemblance to the words uttered by the caller. With a directly mapped lookup table such as the table in FIG. 4, speech training and learning behaviors found in conventional call routing systems are not required. The lookup table may be updated easily, leading to a low cost of system maintenance.

In addition, the method may include using a set of rules to convert a word string into an object or action. In a particular example, geographic designation information, such as an area code, may be used to distinguish between two potential selections or to modify the probability value. In the event that the lookup table of the action-object pair does not provide a suitable response, such as where no entry is found in the routing table, the call may be routed to a human operator or agent terminal in response to a failed access to the action-object lookup table.

Traditional automatic call routing systems are able to assign a correct destination 50-80% of the time. Particular embodiments of the disclosed system and method using action-object tables can assign a correct destination 85-95% of the time. Due to higher effective call placement rates, the number of abandoned calls (i.e., caller hang-ups prior to completing their task) is significantly reduced, thereby reducing operating costs and enhancing customer satisfaction. In addition, the automated call-routing system offers a speech recognition interface that is preferred by many customers to touch tone systems.

The disclosed system and method offers significant improvements through decreased reliance on the conventional iterative semantic model training process. With the disclosed system, a semantic model assigns an action-object pair leading to increased call routing accuracy and reduced costs. In particular implementations, the correct call destination routing rate may reach the theoretical limit of 100%, depending upon particular circumstances. In some cases, certain action-object systems have been implemented that achieve a 100% coverage rate, hit rate, and call destination accuracy rate.

The disclosed system and method is directed generally to integration of action-object technology with speech enabled automated call routing technology. The integration of these two technologies produces a beneficial combination as illustrated. The illustrated system has been described in connection with a call center environment, but it should be understood that the disclosed system and method is applicable to other user interface modalities, such as web-based interfaces, touchtone interfaces, and other speech recognition type systems. The disclosed system and method provides for enhanced customer satisfaction because the customer's intent can be recognized by an action-object pair and a high percentage of calls reach the intended destination.

The above-disclosed subject matter is to be considered illustrative, and not restrictive, and the appended claims are intended to cover all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
a memory; and
a processor coupled to the memory, wherein the memory stores instructions that, when executed by the processor, cause the processor to perform operations comprising:
converting an audio input of a call to text;
determining a first set of objects and a second set of actions from the text;
determining that a particular object of the first set is included in a first portion of a synonym table;
replacing the particular object in the first set with a synonym for the particular object from the synonym table to form a modified first set;
pairing an object from the modified first set with an action from the second set to form an object-action pair; and
routing the call based on the object-action pair.

2. The system of claim 1, wherein the audio input is a speech input.

3. The system of claim 1, wherein the text is associated with a word string.

4. The system of claim 1, wherein each object in the modified first set is associated with a confidence value.

5. The system of claim 4, wherein the object of the object-action pair is selected to be paired with the action based on the confidence value of the object.

6. The system of claim 1, wherein the object of the object-action pair is selected to be paired with the action based on a business rule.

7. The system of claim 1, wherein the operation of replacing the particular object in the first set includes changing a confidence value associated with the particular object.

8. The system of claim 1, wherein the operations further comprise identifying a destination location in a routing table based on the object-action pair.

9. The system of claim 8, wherein the operation of routing the call includes routing the call to the destination location.

10. A method comprising:
converting, at a call routing system, an audio input of a call to text;
determining a first set of objects and a second set of actions from the text at the call routing system;
determining, at the call routing system, that a particular action of the second set is included in a first portion of a synonym table;
replacing, at the call routing system, the particular action in the second set with a synonym for the particular action from the synonym table to form a modified second set;
pairing, at the call routing system, an object from the first set with an action from the modified second set to form an object-action pair; and
routing the call at the call routing system based on the object-action pair.

11. The method of claim 10, wherein each action of the modified second set is associated with a corresponding probability value that represents a probability that the action corresponds to a voice command of a caller.

12. The method of claim 11, wherein the action of the object-action pair is selected to be paired with the object based on the probability value of the action.

13. The method of claim 10, wherein determining the first set of objects and the second set of actions comprises parsing the text.

14. The method of claim 10, wherein routing the call based on the object-action pair comprises:
determining a routing location from a routing table based on the object-action pair; and
routing the call to the routing location.

15. The method of claim 10, wherein the call is a voice over Internet protocol call.

16. The method of claim 10, further comprising receiving the audio input via a web-based interface or a speech recognition interface of the call routing system.

17. A computer-readable storage device comprising instructions executable by a processor to perform operations including:
converting an audio input of a call to text;
parsing the text to determine an action;
determining that the action is included in a first portion of a synonym table;
replacing the action with a synonym for the action from the synonym table to form a modified action;
pairing the modified action with an object from a set of objects based on the text to form an object-action pair;
determining a destination from a routing table based on the object-action pair; and
routing the call to the destination.

18. The computer-readable storage device of claim 17, wherein the object is a particular synonym from the synonym table that replaces a particular object parsed from the text.

19. The computer-readable storage device of claim 17, wherein the action corresponds to a word string of the text.

20. The computer-readable storage device of claim 19, wherein the word string comprises a verb.

\* \* \* \* \*